(12) United States Patent
Ramasamy et al.

(10) Patent No.: US 11,031,674 B1
(45) Date of Patent: Jun. 8, 2021

(54) SYSTEM AND METHOD FOR ANTENNA PATTERN POSITIONING OF INTEGRATED ANTENNA VENT

(71) Applicant: Dell Products, LP, Round Rock, TX (US)

(72) Inventors: Suresh K. Ramasamy, Cedar Park, TX (US); Sumana Pallampati, Austin, TX (US); Changsoo Kim, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 25 days.

(21) Appl. No.: 16/704,998

(22) Filed: Dec. 5, 2019

(51) Int. Cl.
*H01Q 1/22* (2006.01)
*H01Q 1/48* (2006.01)
*G06F 1/16* (2006.01)

(52) U.S. Cl.
CPC ......... *H01Q 1/2266* (2013.01); *G06F 1/1683* (2013.01); *H01Q 1/48* (2013.01)

(58) Field of Classification Search
CPC .......... H01Q 1/2266; H01Q 1/48; H01Q 1/24; G06F 1/1683
See application file for complete search history.

(56) References Cited

U.S. PATENT DOCUMENTS

| | | | |
|---|---|---|---|
| 10,396,431 B2 * | 8/2019 | Ramasamy | G06F 1/1677 |
| 2019/0237848 A1 * | 8/2019 | Ramasamy | G06F 1/1677 |
| 2020/0127384 A1 * | 4/2020 | Thakur | H01Q 1/44 |

* cited by examiner

*Primary Examiner* — Daniel D Chang
(74) *Attorney, Agent, or Firm* — Prol Intellectual Property Law, PLLC; H. Kenneth Prol

(57) ABSTRACT

An information handling system to wirelessly transmit and receive data at an antenna may include a base housing metal chassis containing components of the information handling system, the base housing metal chassis including a C-cover and D-cover housing the components; and an antenna cavity formed within the C-Cover and D-cover including: a first aperture formed through a portion of the D-cover; a second aperture formed through a portion of the C-cover; and a grounding wall formed within the antenna cavity to operatively couple currents associated with the antenna such that the currents travel from the first aperture to the send aperture causing emitted electromagnetic radiation to be emitted towards the second aperture.

20 Claims, 7 Drawing Sheets

SYSTEM AND METHOD FOR ANTENNA PATTERN POSITIONING OF INTEGRATED ANTENNA VENT

FIELD OF THE DISCLOSURE

The present disclosure generally relates to information handling systems, and more particularly relates to an information handling system including an antenna within an antenna cavity with the antenna cavity having a first and second aperture formed within the chassis of the information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling purposes and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. The information handling system may also include telecommunication, network communication, and video communication capabilities. The information handling system may also include one or more buses operable to transmit communications between the various hardware components. The information handling system may also include telecommunication, network communication, and video communication capabilities. Information handling system chassis parts may include case portions such as for a laptop information handling system including the C-cover over components designed with a metal structure. The information handling system may be configurable such that the information handling system may alter a pattern of electromagnetic (EM) radiation emitted by an antenna of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
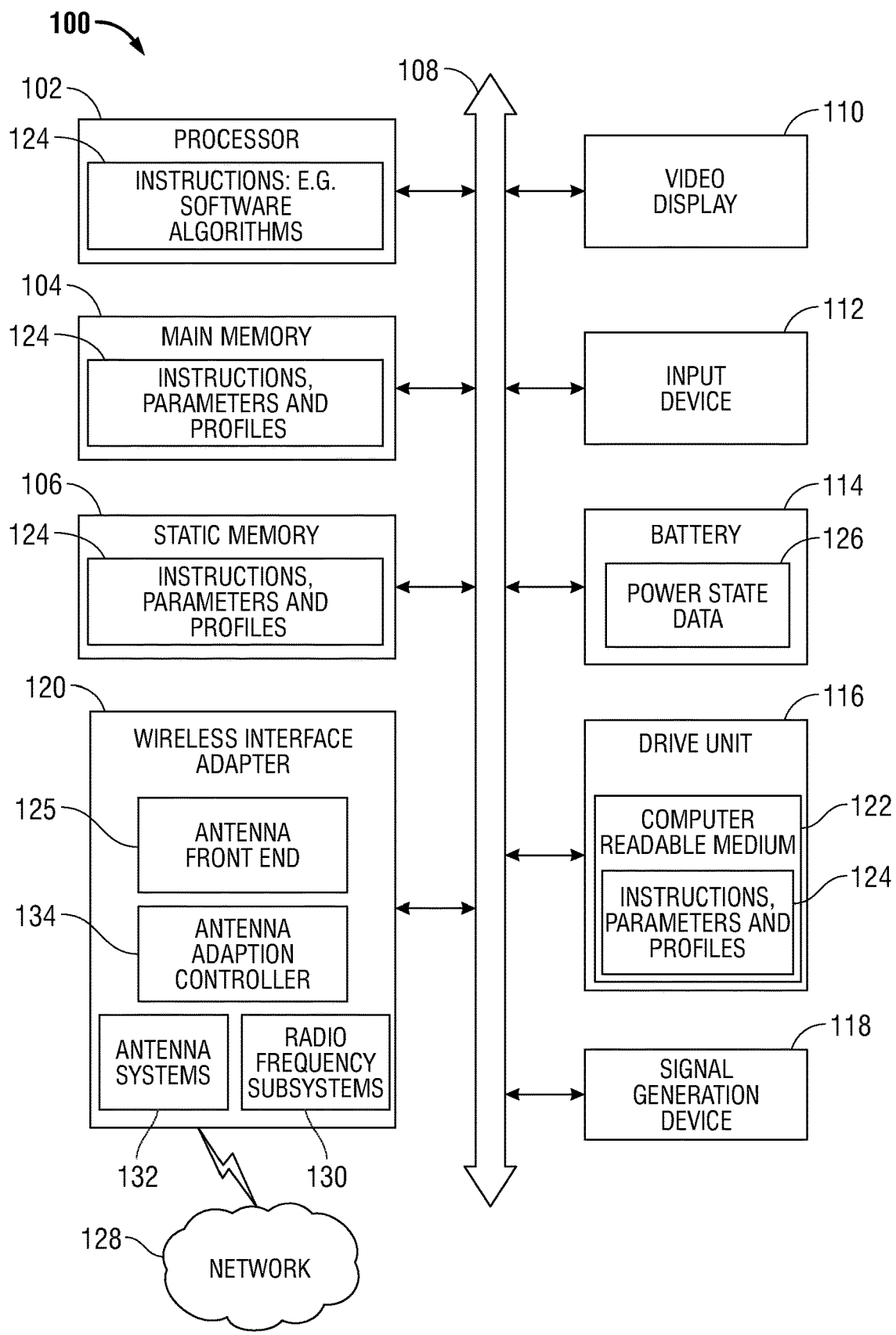
FIG. 1 illustrates an embodiment of information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

For aesthetic, strength, and performance reasons, information handling system chassis parts are more commonly designed with a metal structure. In an embodiment, a laptop information handling system may include a plurality of covers for the interior components of the information handling system. For example, a small form factor case may include an "A-cover" which serves as a back cover for a display housing and a "B-cover" which may serve as the bezel, if any, and a display screen of the convertible laptop information handling system in an embodiment. In a further embodiment, the laptop information handling system case may include a "C-cover" housing a keyboard, touchpad, and any cover in which these components are set and a "D-cover" base housing for the information handling system. In order to increase the utility of these lighter, thinner, and more streamlined devices, the use of full metal portions for the outer covers of the display and base housing (e.g. the A-cover and the D-cover) is desirable for strength as well as aesthetic reasons. At the same time, the demands for wireless operation also increase. This demand for wireless operations may include the addition of many simultaneously operating radiofrequency systems, the addition of more antennas, and/or the utilization of various antenna types. However, the thinner and more streamlined devices have fewer locations and area available for mounting radiofrequency transmitters on these mobile information handling systems. Thus, a streamlined, full metal chassis capable of meeting the increasing wireless operation demands is needed.

Previous information handling systems would address these competing needs by providing for cutout portions of a metal outer chassis cover filled with plastic behind which radio transmitters would be mounted. The cutouts to accommodate radio frequency (RF) transmitters were often aesthetically undesirable and required additional plastic components to cover the cutout, thus failing to fully meet the streamlining needs. The plastic components added a component to be manufactured and were required to be seamlessly integrated into an otherwise smooth metal chassis cover. Further, the plastic portions included may be more expensive to machine than aluminum alloy metals, and may require intricate multi-step processes for integrating the metal and plastic parts into a single chassis. This requirement to incorporate the plastic parts into the chassis could require difficult and expensive processes to manufacture with fewer desirable results.

In addition, in the case of a convertible laptop information handling system, 360-degree configurability may be a feature available to a user during use. Thus, often an antenna such as an aperture antenna system would be located at the top (e.g. "A-cover") with a plastic antenna window in a metal chassis cover to radiate in 360-degree mode (such as closed mode), or at the bottom (e.g. "D-cover") to radiate in 360-degree mode (such as tablet mode). Such a configuration could make the display panel housing (e.g. "A-cover") or the base panel housing (e.g. "D-cover") thicker, to accommodate antennas circuitry, or cables behind the plastic panel at the top (or bottom) of either housing. Overall, a thicker convertible laptop information handling system may result, thus failing to meet the streamlining needs. A solution is needed that does not increase the thickness of the metal chassis, and does not require additional components and manufacturing steps while providing for alternative locations for antenna placement.

Embodiments of the present disclosure may decrease the complexity and cost of creating chassis for information handling systems by forming the outer chassis (e.g. the A-cover and the D-cover) entirely of metal and placing the antenna at a location within a D-cover and C-cover assembly. This placement of the antenna into the D-cover and C-cover assembly may also include the formation of a first antenna aperture through the D-cover and a second antenna aperture through the C-cover. A cavity into which the antenna is placed may include a grounding wall that operatively couples currents associated with the antenna such that the currents travel from the first aperture to the second aperture causing emitted electromagnetic radiation to be emitted towards the second aperture and, generally, out of the C-cover. This provides for a system that may re-direct antenna transmissions above the transmission horizon which may be more effective for base stations located in elevated places. In some embodiments, the configuration of the information handling system may cause the second aperture to direct the electromagnetic radiation in the form of radio frequencies out of the C-cover and above horizon as the information handling system is placed in a predetermined configuration. In some embodiments, WiFi access points may often be located along a ceiling or similar location. Additionally, regardless of the orientation of the information handling system, the antenna receipt and transmission strength may remain constant with multiple apertures.

The metal chassis in embodiments described herein may include a hinge operably connecting the "A-cover" to the "D-cover" such that the keyboard and touchpad enclosed within the "C-cover" and attached to the "D-cover" may be placed in a plurality of configurations with respect to the digital display enclosed within the "B-cover" and attached to the "A-cover." The plurality of configurations may include, but may not be limited to, an open configuration in which the "A-cover" is oriented at a right or obtuse angle from the "D-cover" (similar to an open laptop computer), a closed configuration in which the "A-cover" lies substantially parallel to the "D-cover" (similar to a closed laptop computer), a tablet configuration in which the "A-cover" is rotated nearly 360 degrees from its closed orientation (placing the "D-cover" directly beneath the "A-cover," such that the user can interact with the digital display enclosed within the "B-cover"), and an easel configuration (i.e., FIG. 3C) in which the C-cover is placed on a working surface with the D-cover facing upwards and the B-cover facing a user. Despite these different configurations, however, the antenna, its cavities, and the first and second apertures provides for the streamlining of the information handling system without compromising the ability of the antenna to transmit and receive data from and to the information handling system.

Manufacture of embodiments of the present disclosure may involve fewer extraneous parts than previous chassis by forming the exterior or outer portions of the information handling system, including the bottom portion of the "D-cover", the "C-cover", the "B-cover," and the "A-cover," entirely from metal. In order to allow for manufacture of fully metallic outer chassis, embodiments of the present disclosure form the full form factor case enclosing the information handling system such that one or more transmitting antennas within the antenna cavity integrated into the base metal chassis (i.e., "D-cover") of the information handling system.

The transmitting antennas of embodiments of the present disclosure may include one or more aperture antennas. In embodiments presented herein, the aperture antennas may be cavity backed. Aperture antennas in embodiments of the present disclosure may be a highly effective improvement on wireless antennas employed in previous information handling systems. In embodiments of the present disclosure, a first and second antenna aperture or slot may be formed through the D-cover and C-cover respectively. In the embodiments presented herein, the first and second apertures may work in coordination with a grounded cavity to provide direction transmissions or receptions between the two apertures. These apertures associated with the antenna in embodiments of the present disclosure may then be operably connected to a grounding wall such that the apertures create a reduction in impedance between the first and second aperture. This low impedance path enables the antenna currents from the first aperture to travel to or through the second aperture thereby exciting the second aperture at the C-cover causing the electromagnetic (EM) pattern to tilt from the bottom of the D-cover towards the horizon and away from the information handling system. The second aperture may direct EM radiation out of the C-cover and above horizon when the information handling system is place in predetermined configurations such as an open configuration. An angling and distance between the first aperture and the second aperture, as well as the dimension of the first and second apertures provide for desired directionality of the transmission and reception of EM radiation via the C-cover.

Examples are set forth below with respect to particular aspects of an information handling system including case portions such as for a laptop information handling system including the chassis components designed with a fully metal structure and configurable such that the information handling system may operate in any of several usage mode configurations.

FIG. 1 shows an information handling system 100 capable of administering each of the specific embodiments of the present disclosure. The information handling system 100, in an embodiment, can represent the mobile information handling systems 210, 220, and 230 or servers or systems located anywhere within network 200 described in connection with FIG. 2 herein, including the remote data centers operating virtual machine applications. Information handling system 100 may represent a mobile information handling system associated with a user or recipient of intended wireless communication. A mobile information handling system may execute instructions via a processor such as a microcontroller unit (MCU) operating both firmware instructions or hardwired instructions for the antenna adaptation controller 134 to achieve WLAN or WWAN antenna operations according to embodiments disclosed herein. The application programs operating on the information handling system 100 may communicate or otherwise operate via concurrent wireless links, individual wireless links, or combinations over any available RAT protocols including WLAN protocols. These application programs may operate in some embodiments as software, in whole or in part, on an information handling system while other portions of the software applications may operate on remote server systems. The antenna adaptation controller 134 of the presently disclosed embodiments may operate as firmware or hardwired circuitry or any combination on controllers or processors within the information handing system 100 for interface with components of a wireless interface adapter 120. It is understood that some aspects of the antenna adaptation controller 134 described herein may interface or operate as software or via other controllers associated with the wireless interface adapter 120 or elsewhere within information handling system 100. Information handling system 100 may also represent a networked server or other system from which some software applications are administered or which wireless communications such as across WLAN or WWAN may be conducted. In other aspects, networked servers or systems may operate the antenna adaptation controller 134 for use with a wireless interface adapter 120 on those devices similar to embodiments for WLAN or WWAN antenna optimization operation according to according to various embodiments.

The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, or a solid-state display. Display 110 may include a touch screen display module and touch screen controller (not shown) for receiving user inputs to the information handling system 100. Touch screen display module may detect touch or proximity to a display screen by detecting capacitance changes in the display screen as understood by those of skill. Additionally, the information handling system 100 may include an input device 112, such as a keyboard, and a cursor control device, such as a mouse or touchpad or similar peripheral input device. The information handling system may include a power source such as battery 114 or an A/C power source. The information handling system 100 can also include a disk drive unit 116, and a signal generation device 118, such as a speaker or remote control. The information handling system 100 can include a network interface device such as a wireless adapter 120. The information handling system 100 can also represent a server device whose resources can be shared by multiple client devices, or it can represent an individual client device, such as a desktop personal computer, a laptop computer, a tablet computer, a 360-degree convertible device, a wearable computing device, or a mobile smart phone.

The information handling system 100 can include sets of instructions 124 that can be executed to cause the computer system to perform any one or more desired applications. In many aspects, sets of instructions 124 may implement wireless communications via one or more antenna systems 132 available on information handling system 100. Operation of WLAN and WWAN wireless communications may be enhanced or otherwise improved via WLAN or WWAN antenna operation adjustments via the methods or controller-based functions relating to the antenna adaptation controller 134 disclosed herein. For example, instructions or a controller may execute software or firmware applications or algorithms which utilize one or more wireless links for wireless communications via the wireless interface adapter as well as other aspects or components. The antenna adaptation controller 134 may execute instructions as disclosed herein for monitoring wireless link state information, information handling system configuration data, or other input data to create certain antenna radiation patterns. In the embodiments presented herein, the antenna adaptation controller 134 may execute instructions as disclosed herein to transmit a communications signal from an antenna located within an antenna cavity, create a level of impedance between a first aperture and a second aperture, and form an EM radiation pattern (i.e., RF radiation pattern) that extends out of the C-cover of the information handling system 100 instead of only down and out of a D-cover. In the embodiments presented herein, the antenna adaptation controller 134 may execute instructions as disclosed herein to excite the antenna at a certain current and voltage such that signals may be sent and received at the second aperture formed through the C-cover.

The antenna adaptation controller 134 may implement adjustments to wireless antenna systems and resources via a radio frequency integrated circuit (RFIC) front end 125 and WLAN or WWAN radio module systems within the wireless interface device 120. Aspects of the antenna optimization for the antenna adaptation controller 134 may be included as part of an antenna front end 125 in some aspects or may be included with other aspects of the wireless interface device 120 such as WLAN radio module such as part of the radio frequency subsystems 130. The antenna adaptation controller 134 described in the present disclosure and operating as firmware or hardware (or in some parts software) may remedy or adjust one or more of a plurality of antenna systems 132 via selecting power adjustments and adjustments to an antenna adaptation network to modify antenna radiation patterns and parasitic element operations. In an embodiment, multiple WLAN or WWAN antenna systems may operate on various communication frequency bands such as under IEEE 802.11a and IEEE 802.11g providing multiple band options for frequency channels. Further antenna radiation patterns and selection of antenna options or power levels may be adapted improvement of RF channel operation according to received signal strength indicator (RSSI), signal to noise ratio (SNR), bit error rate (BER), modulation and coding scheme index values (MCS), or data throughput indications among other factors. In some aspects WLAN antenna adaptation controller may execute firmware algorithms or hardware to regulate operation of the one or more antenna systems 132 such as WLAN antennas in the information handling system 100 to avoid poor wireless link performance due to poor reception, poor MCS levels of data bandwidth available, or poor indication of throughput due to indications of low RSSI, low power levels available (such as due to SAR), inefficient radiation patterns among other potential effects on wireless link channels used.

Various software modules comprising software application instructions 124 or firmware instructions may be coordinated by an operating system (OS) and via an application programming interface (API). An example operating system may include Windows®, Android®, and other OS types known in the art. Example APIs may include Win 32, Core Java API, Android APIs, or wireless adapter driver API. In a further embodiment, processor 102 may conduct processing of mobile information handling system applications by the information handling system 100 according to the systems and methods disclosed herein which may utilize wireless communications.

The computer system 100 may operate as a standalone device or may be connected such as using a network, to other computer systems or peripheral devices. In other aspects, additional processor or control logic may be implemented in graphical processor units (GPUs) or controllers located with radio modules or within a wireless adapter 120 to implement method embodiments of the antenna adaptation controller and antenna optimization according to embodiments herein. Code instructions 124 in firmware, hardware or some combination may be executed to implement operations of the antenna adaptation controller and antenna optimization on control logic or processor systems within the wireless adapter 120 for example.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a tablet computer, a laptop computer, a desktop computer, a communications device, a wireless smart phone, wearable computing devices, a land-line telephone, a control system, a camera, a scanner, a printer, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Some memory or storage may reside in the wireless adapter 120. Further, the instructions 124 that embody one or more of the methods or logic as described herein. For example, instructions relating to the WLAN antenna adaptation system or antenna operations described in embodiments herein may be stored here or transmitted to local memory located with the antenna adaptation controller 134, antenna front end 125, or wireless module in radiofrequency subsystem 130 in the wireless interface adapter 120.

In a particular embodiment, the instructions, parameters, and profiles 124 may reside completely, or at least partially, within a memory, such as non-volatile static memory, during execution of antenna adaptation by the antenna adaptation controller 134 in wireless interface adapter 132 of information handling system 100. As explained, some or all of the WLAN antenna adaptation and antenna optimization may be executed locally at the antenna adaptation controller 134, RF front end 125, or wireless module subsystem 130. Some aspects may operate remotely among those portions of the wireless interface adapter or with the main memory 104 and the processor 102 in parts including the computer-readable media in some embodiments.

Battery 114 may include a smart battery system or a power management unit that tracks and provides power state data 126. This power state data may be stored with the instructions, parameters, and profiles 124 to be used with the systems and methods disclosed herein in determining WLAN antenna adaptation and antenna optimization in some embodiments.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 130 with transmitter/receiver circuitry, modem circuitry, one or more antenna front end circuits 125, one or more wireless controller circuits such as antenna adaptation controller 134, amplifiers, antenna systems 132 and other radio frequency subsystem circuitry 130 for wireless communications via multiple radio access technologies. Each radiofrequency subsystem 130 may communicate with one or more wireless technology protocols. The radiofrequency subsystem 130 may contain individual subscriber identity module (SIM) profiles for each technology service provider and their available protocols for subscriber-based radio access technologies such as cellular LTE communications. The wireless adapter 120 may also include antenna systems 132 which may be tunable antenna systems or may include an antenna adaptation network for use with the system and methods disclosed herein to optimize antenna system operation.

In some aspects of the present disclosure, a wireless adapter 120 may operate two or more wireless links. In a further aspect, the wireless adapter 120 may operate the two or more wireless links with a single, shared communication frequency band such as with the Wi-Fi WLAN operation or 5G LTE standard WWAN operations in an example aspect. For example, a 5.8 GHz wireless communication frequency band and/or a 2.4 GHz wireless communication frequency band may be apportioned under the 5G standards for communication on either small cell WWAN wireless link operation or Wi-Fi WLAN operation as well as other wireless activity in LTE, WiFi, WiGig, Bluetooth, or other communication protocols. In some embodiments, the shared, wireless communication bands may be transmitted through one or a plurality of antennas. Other communication frequency bands are contemplated for use with the embodiments of the present disclosure as well.

In other aspects, the information handling system 100 operating as a mobile information handling system may operate a plurality of wireless adapters 120 for concurrent radio operation in one or more wireless communication bands. The plurality of wireless adapters 120 may further a wireless communication bands or operate in nearby wireless communication bands in some disclosed embodiments. Further, harmonics, environmental wireless conditions, and other effects may impact wireless link operation when a plurality of wireless links are operating as in some of the presently described embodiments.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 and antenna adaptation controller 134 may connect to any combination of macro-cellular wireless connections including 2G, 2.5G, 3G, 4G, 5G or the like from one or more service providers. Utilization of radiofrequency communication bands according to several embodiments of the present disclosure may include bands used with the WLAN standards and WWAN carriers which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are propriety but may include a wireless communication frequency band at approximately 2.5 GHz band for example. In additional embodiments, WWAN carrier licensed bands may operate at frequency bands of approximately 700 MHz, 800 MHz, 1900 MHz, or 1700/2100 MHz for example as well. In the embodiment, mobile information handling system 100 includes both unlicensed wireless radio frequency communication capabilities as well as licensed wireless radio frequency communication capabilities. For example, licensed wireless radio frequency communication capabilities may be available via a subscriber carrier wireless service. With the licensed wireless radio frequency communication capability, WWAN RF front end may operate on a licensed WWAN wireless radio with authorization for subscriber access to a wireless service provider on a carrier licensed frequency band.

The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers such as wireless module subsystems for connecting via a multitude of wireless links under a variety of protocols. In an embodiment, an information handling system may have an antenna system transmitter 132 for 5G small cell WWAN, Wi-Fi WLAN or WiGig connectivity and one or more additional antenna system transmitters 132 for macro-cellular communication. The radio frequency subsystems 130 include wireless controllers to manage authentication, connectivity, communications, power levels for transmission, buffering, error correction, baseband processing, and other functions of the wireless adapter 120.

The radio frequency subsystems 130 of the wireless adapters may also measure various metrics relating to wireless communication pursuant to operation of an antenna system as in the present disclosure. For example, the wireless controller of a radio frequency subsystem 130 may manage detecting and measuring received signal strength levels, bit error rates, signal to noise ratios, latencies, power delay profile, delay spread, and other metrics relating to signal quality and strength. Such detected and measured aspects of wireless links, such as WLAN links operating on one or more antenna systems 132, may be used by the antenna adaptation controller to adapt the antenna systems 132 according to an antenna adaptation network according to various embodiments herein. In one embodiment, a wireless controller of a wireless interface adapter 120 may manage one or more radio frequency subsystems 130. The wireless controller also manages transmission power levels which directly affect radio frequency subsystem power consumption as well as transmission power levels from the plurality of antenna systems 132. To control and measure power consumption via a radio frequency subsystem 130, the radio frequency subsystem 130 may control and measure current and voltage power that is directed to operate one or more antenna systems 132.

The wireless network may have a wireless mesh architecture in accordance with mesh networks described by the wireless data communications standards or similar standards in some embodiments but not necessarily in all embodiments. The wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs 124 and BIOS/FW code 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
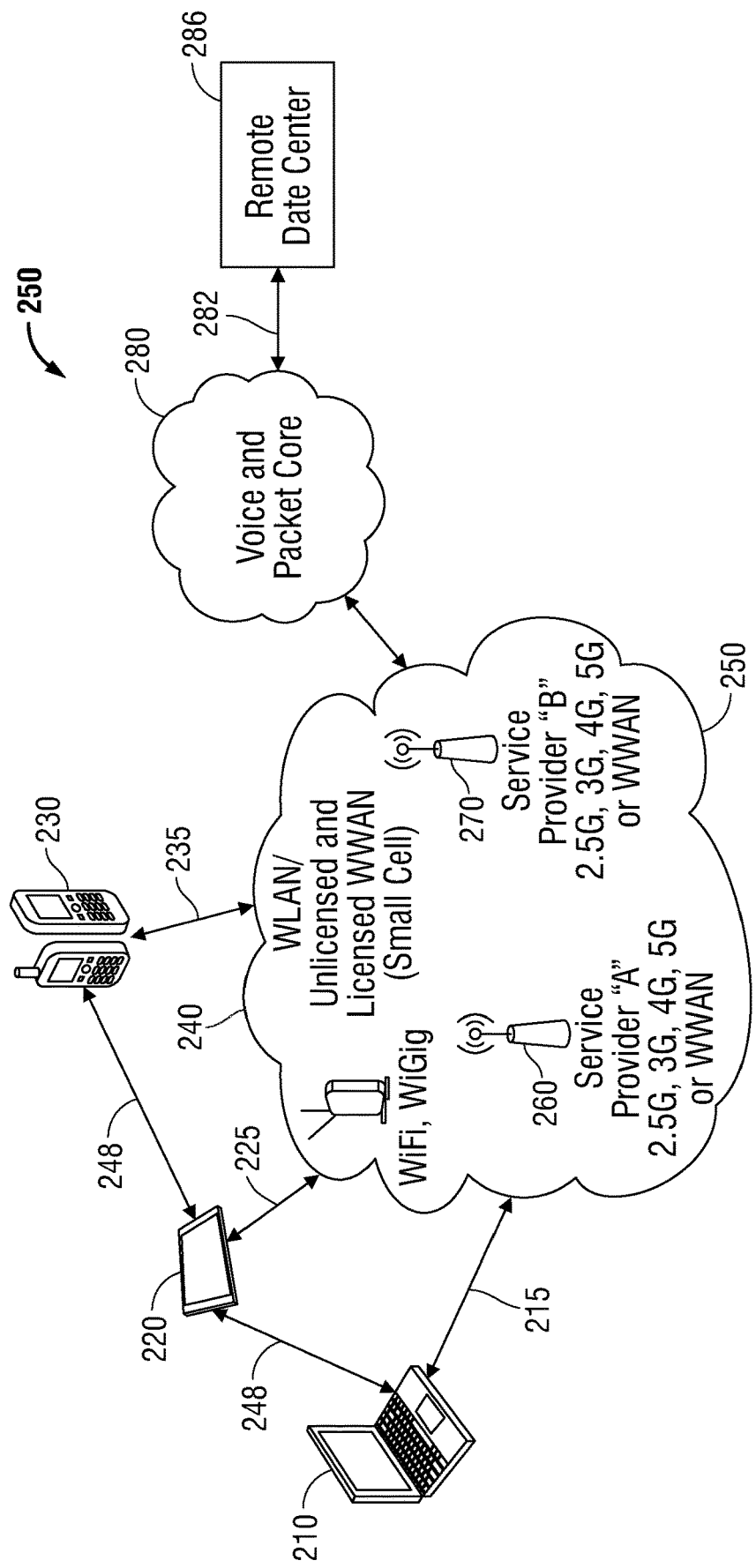
FIG. 2 is a block diagram of a network environment offering several communication protocol options and mobile information handling systems according to an embodiment of the present disclosure.

FIG. 2 illustrates a network 200 that can include one or more information handling systems 210, 220, 230. In a particular embodiment, network 200 includes networked mobile information handling systems 210, 220, and 230, wireless network access points, and multiple wireless connection link options. A variety of additional computing resources of network 200 may include client mobile information handling systems, data processing servers, network storage devices, local and wide area networks, or other resources as needed or desired. As partially depicted, systems 210, 220, and 230 may be a laptop computer, tablet computer, 360-degree convertible systems, wearable computing devices, or a smart phone device. These mobile information handling systems 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands, 2.4 GHz frequency bands, or 3.5 GHz conditional shared communication frequency bands under FCC Part 96. Wi-Fi ISM frequency bands that could be subject to sharing include 2.4 GHz, 60 GHz, 900 MHz or similar bands. Within local portion of wireless network 250 access points for Wi-Fi or WiGig as well as small cell WWAN connectivity may be available in emerging 5G technology. This may create situations where a plurality of antenna systems are operating on a mobile information handling system 210, 220 or 230 via concurrent communication wireless links on both WLAN and WWAN and which may operate within the same, adjacent, or otherwise interfering communication frequency bands. The antenna may be a transmitting antenna that includes high-band, medium-band, low-band, and unlicensed band transmitting antennas. Alternatively, embodiments may include a single transceiving antenna capable of receiving and transmitting, and/or more than one transceiving antennas. The antenna in the embodiments described herein is an aperture antenna or a cavity-backed antenna system. Aperture antennas in embodiments of the present disclosure may be highly effective wireless antennas employed in information handling systems.

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers may include web servers or resources within a cloud environment that operate via the voice and packet core 280 or other wider internet connectivity. For example, remote data centers can include additional information handling systems, data processing servers, network storage devices, local and wide area networks, or other resources along with an addition to those shown in FIG. 2. Having such remote capabilities may permit fewer resources to be maintained at the mobile information handling systems 210, 220, and 230 allowing streamlining and efficiency within those devices. Similarly, remote data center permits fewer resources to be maintained in other parts of network 200.

In an embodiment, the cloud or remote data center or networked server may run hosted applications for systems 210, 220, and 230. For example, remote data center, networked server, or some combination of both may operate some or all of an antenna system as disclosed in the present disclosure. The cloud or remote data center or networked server may run hosted applications for systems 210, 220, and 230 by establishing a virtual machine application executing software to manage applications hosted at the remote data center in an embodiment. Mobile information handling systems 210, 220, and 230 are adapted to run one or more applications locally, and to have hosted applications run in association with the local applications at remote data center or networked servers. For example, mobile information handling systems 210, 220, and 230 may operate some or all of the antenna system or software applications utilizing the wireless links, including a concurrent wireless links, in some embodiments. The virtual machine application may serve one or more applications to each of mobile information handling system 210, 220, and 230. Thus, as illustrated, information handling systems 210, 220, and 230 may be running applications locally while requesting data objects related to those applications from the remote data center via wireless network. In another embodiment, an electronic mail client application may run locally at system 210. The electronic mail client application may be associated with a host application that represents an electronic mail server. In another embodiment, a data storage client application may run on system 220. It may be associated with a host application running at a remote data center that represents a Sharepoint data storage server. In a further embodiment, a web browser application may be operating at system 230. The web browser application may request web data from a host application that represents a hosted website and associated applications running at a remote data center.

Although connections 215, 225, and 235 are shown connecting wireless adapters of mobile information handling systems 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as an access point or even potentially an WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access points including other mobile information handling systems as illustrated in FIG. 2.

Figure 3A:
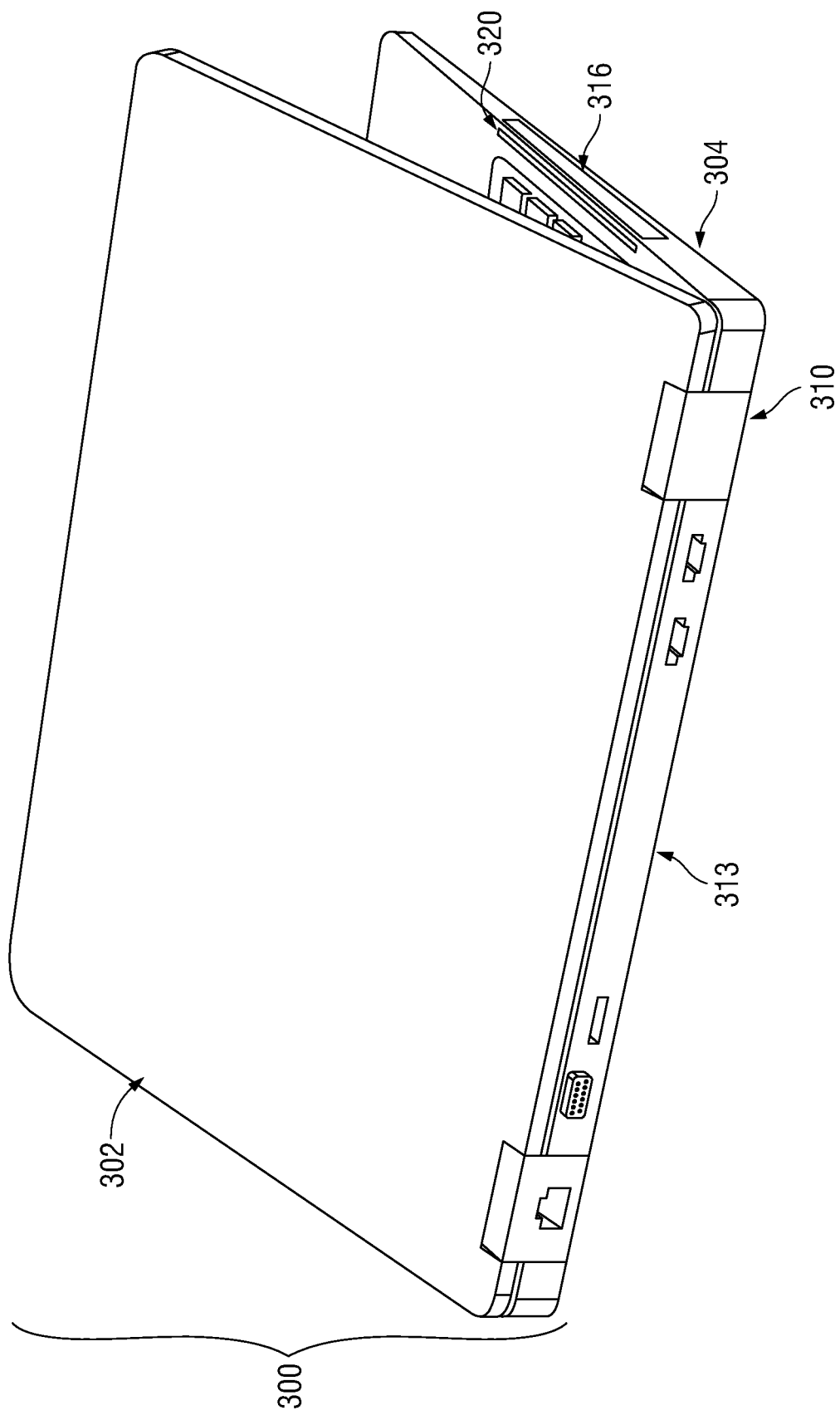
FIG. 3A is a graphical illustration, perspective view of a metal chassis placed in a near-closed configuration according to an embodiment of the present disclosure.

FIG. 3A is a graphical illustration of a metal chassis including a base chassis and lid chassis placed in the near-closed configuration according to an embodiment of the present disclosure. The near-closed configuration is shown to provide a view of one embodiment of a first aperture 316 and of a second aperture 320 location. The metal chassis 300 in an embodiment may comprise an outer metal case or shell of an information handling system such as a tablet device, laptop, or other mobile information handling system. As shown in FIG. 3A, the metal chassis 300, in an embodiment, may further include a plurality of chassis or cases. For example, the metal chassis 300 may further include the A-cover 302 functioning to enclose a portion of the information handling system. As another embodiment, the metal chassis 300, in an embodiment, may further include a D-cover 304 functioning to enclose another portion of the information handling system which may include a transmitting/receiving antenna according to the embodiments described herein. As shown in FIG. 3A, when placed in a closed configuration, the A-cover 302 forms a top outer protective shell, or a portion of a lid for the information handling system, while the D-cover 304 forms a bottom outer protective shell, or a portion of a base. As also can be seen in FIG. 3A, in the closed configuration, the A-cover 302 and the D-cover 304 are substantially parallel to one another.

In an embodiment, the A-cover 302 may be movably connected to a back edge 312 of the D-cover 314 via one or more hinges 310. The A-cover 302 may be operably connected to the one or more hinges 310 is disposed between the A-cover 302 and the one or more hinges 310, in an embodiment. The placement of the hinges 310 may vary depending on the type of hinge used as well as any cosmetic or mechanical requirements used to couple the A-cover and its assembly to the D-cover and its assembly. As described herein, a first aperture 316 is formed into the D-cover 304 while a second aperture 320 is formed through the C-cover. In the embodiments presented herein, the first aperture 316 may be formed at an angle downward relative to the second aperture 320 that this formed up through the C-cover. These apertures 316, 320 may be backed with an antenna cavity as described herein.

Figure 3B:
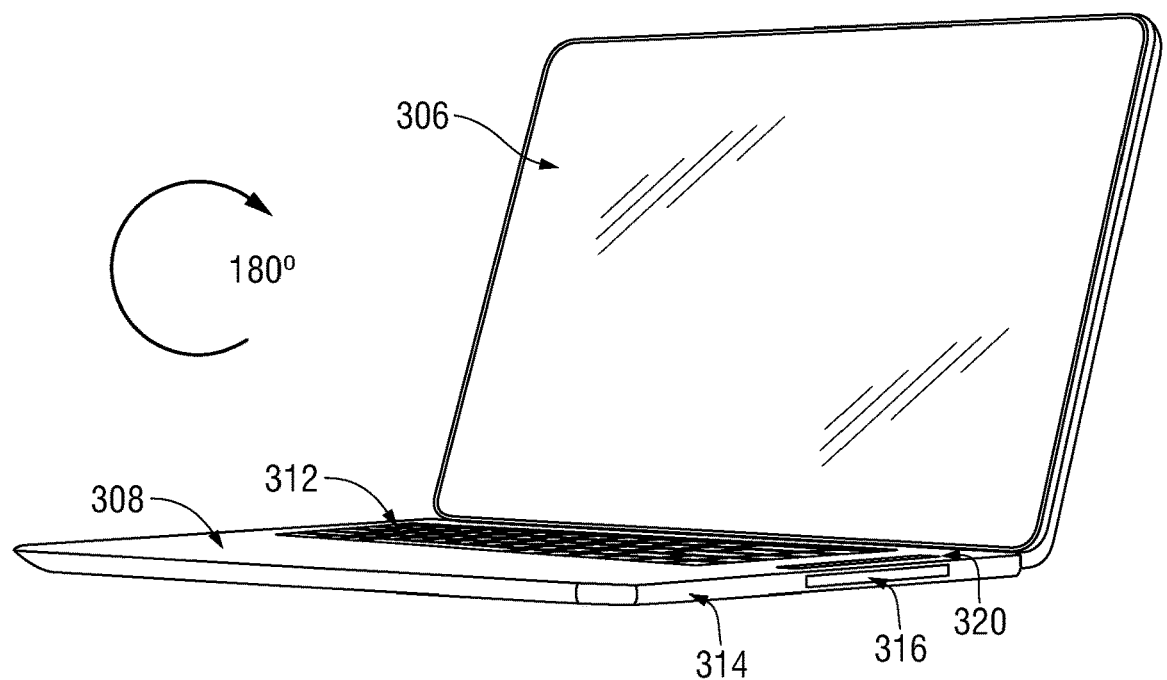
FIG. 3B is a graphical illustration, perspective view of a metal chassis placed in an open configuration according to an embodiment of the present disclosure.

FIG. 3B is a graphical illustration of a metal chassis 300 including a base chassis and lid chassis placed in the open configuration according to an embodiment of the present disclosure. The metal chassis 300 in an embodiment may further comprise an outer metal case or shell of an information handling system for housing internal components of the information handling system, such as a video display, a cursor control device, and an alpha numeric input device. The open configuration of FIG. 3B shows another embodiment of a location for the first aperture 316 and second aperture 320. It is understood that the first aperture 316 and the aperture 320 may be located on any side of the C-cover 308 and D-cover 304. As shown in FIG. 3B, the metal chassis 300 may further include the B-cover 306 functioning to enclose the video or digital display device with the A-cover described herein. In this embodiment, the B-cover 306 may not include a bezel surrounding a screen or other display device as described herein. As described herein, the physical footprint of the video display may be increased so as to increase the usability and functionality of the information handling system. In some embodiments, the increase in the size of the video display (i.e., thereby eliminating the bezel or significantly decreasing the size of the bezel) may be motivated by industry standards based on user desirability in larger screens to provide more viewable space and functionality of the information handling system. As described herein, as the size of the video display increases, the placement of an antenna associated with the antenna systems within the A-cover/B-cover assembly may be limited if not completely eliminated. As such, the antenna may be placed within the D-cover 304/C-cover 308 assembly according to any embodiment described herein.

In the embodiments presented and as described herein, the metal chassis 300 may further include the C-cover 308 functioning to enclose the cursor control device and/or the keyboard 112 acting as an alpha numeric input device. The A-cover 302 and the B-cover 306 may be joined together in an embodiment to form a fully enclosed lid chassis, while the C-cover 308 and the D-cover 304 may be joined together to form a fully enclosed base chassis. Taking the closed configuration as a reference position of the lid chassis including the A-cover and the B-cover 306 and the base chassis including the C-cover 308 and the D-cover 304, the lid chassis including the A-cover 302 and the B-cover 306 may be rotated away from the base chassis including the C-cover 308 and the D-cover 304. For example, as shown in FIG. 3B, when placed in the open configuration, the lid chassis including the A-cover 302 and the B-cover 306 may be rotated away from the C-cover 308 and placed at an angle less than 180 degrees from the base chassis including the C-cover 308 and the D-cover 304, such that a user may view the video display within the B-cover 306 and interact with the cursor control device and/or keyboard 112 within the C-cover 308. According to any embodiment presented herein, an antenna is placed within a cavity formed within the base chassis including the C-cover 308 and the D-cover 304 with a first aperture 316 formed through the D-cover 304 and a second aperture formed through the C-cover 308 (shown in more detail in FIGS. 3D, 3E, and 3F). In any embodiment, the first aperture 316 is sized to operate at a frequency of 2.4 GHz and 5.1 GHz. The antenna formed within the cavity may be excited at 5.8 GHz with a main lobe of the radio frequency (RF) energy pointed to a bottom surface of the D-cover 304. Additionally, in any embodiment presented herein, the information handling system may include a second aperture 320 formed through the C-cover 308 and sized to operate in tandem with the first aperture 316 so as to be tuned to a location and relative angle between the first aperture 316 and second aperture 320. Because the first aperture 316 and second aperture 320 share a common electrical ground between them, a low impedance path is formed between the first aperture 316 and second aperture 320 so as to enable any currents associated with the antenna at the first aperture 316 to travel or radiate upwards to and through the second aperture 320. This, in turn, causes the electrical currents to pass the signal through to the second aperture 320 causes any RF EM radiation to exit the grounded antenna cavity containing the antenna via the second aperture 320. As such, instead of the main lobe of the RF EM radiation pointing towards the bottom of the D-cover 304 via only the first aperture 316, the RF EM radiation is emitted from the C-cover 308 above the horizon as well.

Figure 3C:
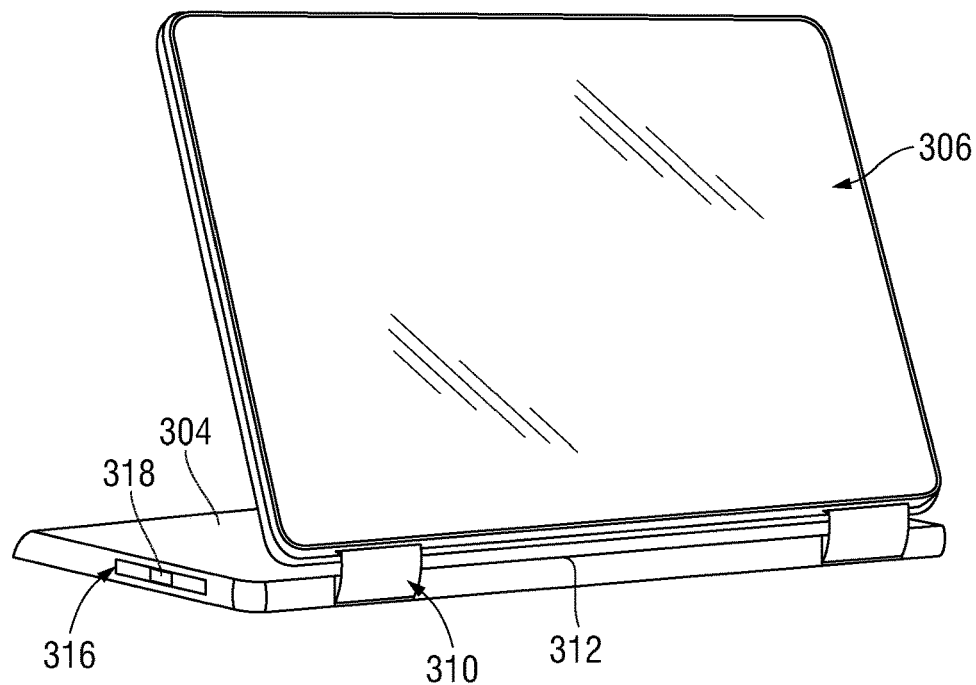
FIG. 3C is a graphical illustration, perspective view of a metal chassis placed in an easel configuration according to an embodiment of the present disclosure.

FIG. 3C is a graphical illustration of a metal chassis including a base chassis and lid chassis placed in the easel configuration according to an embodiment of the present disclosure. As shown in FIG. 3C, the lid chassis including the A-cover and the B-cover 306 may be joined to the base chassis including the C-cover and the D-cover 304 via one or more hinges 310. The hinge 310 in an embodiment may be capable of placing the lid chassis and base chassis in a plurality of positional configurations with respect to one another, including, but not limited to the open (i.e., shown in FIG. 3B), closed, easel (i.e., FIG. 3C) or even tablet configurations. Taking the closed configuration as a reference position of the lid chassis including the A-cover and the B-cover 306 and the base chassis including the C-cover and the D-cover 304, the hinge 310 may allow for a 180-degree or greater rotation of the lid chassis to place the lid chassis and base chassis in the tablet configuration with the A-cover 302 and D-cover 304 adjacent, for example. As shown in FIG. 3C, the lid chassis including the A-cover 302 and the B-cover 306 in an embodiment may rotate greater than 180-degrees and up to nearly 360-degrees such that the video display of the B-cover 306 may face toward the user and the keyboard of the C-cover 308 may face away from the user. If the lid chassis including the A-cover and the B-cover 306 are rotated to almost 360-degrees from the closed configuration, the A-cover 302 may abut the D-cover 304 for the closed configuration.

As described herein, a first aperture 316 is formed into the D-cover 304 while a second aperture 320 is formed through the C-cover. In the embodiments presented herein, the first aperture 316 may be formed at an angle to the side or downward relative to the second aperture 320 that this formed up through the C-cover. These apertures 316, 320 may be backed with an antenna cavity as described herein. During operation of the information handling system, an antenna within the antenna cavity housing the antenna may generate an RF signal directed towards the bottom of the D-cover 304. In order to tilt the direction of the generate RF signal from the bottom of the D-cover 304 to above the horizon, the second aperture 320 is used. The second aperture 320 and the first aperture 316 are grounded to a common ground such as a grounding wall within the antenna cavity. This produces a low impedance path form the first aperture 316 to the second aperture 320 enabling the currents produced by the antenna to migrate away from the first aperture 316 to the second aperture 320 causing the RF signal to exit from the second aperture 320. This produces a new RF signal pattern emitted by the antenna to be created; a pattern that includes a main lobe directed towards the horizon up and away from the information handling system.

Figure 3D:
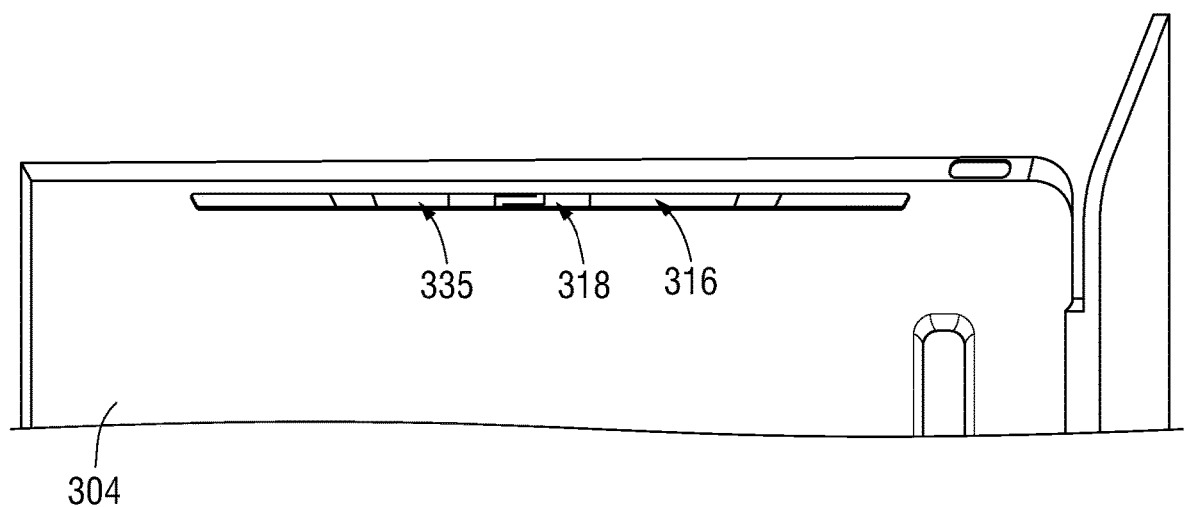
FIG. 3D is a graphical illustration of a first aperture containing an antenna formed in the D-cover of an information handling system according to an embodiment of the present disclosure.

FIG. 3D is a graphical illustration of an antenna 318 within an antenna cavity 335 and a first aperture 316 formed through the D-cover according to an embodiment of the present disclosure. FIG. 3D shows the first aperture 316 of the antenna cavity 335 in an embodiment along an edge of the bottom portion of the D-cover 304. The aperture 316 (and, accordingly, the antenna cavity 335) may be formed along any portion of the D-cover 304 such as on a side face of the D-cover 304 a side edge of the D-cover 304, or any other location of the D-cover 304. As shown in FIG. 3D, the antenna cavity 335 is formed on a side surface of the D-cover 304 at a location where the bottom of the D-cover 304 slopes up towards an interfacing location between the C-cover 308 and D-cover 304.

In an embodiment, a grounding wall may be used to ground the first aperture 316 to the chassis as well as a second aperture (not shown in FIG. 3D). The grounding wall may be used to create an antenna cavity 335 with respect to the first aperture 316, but may also be used to insulate the antenna 318 within the antenna cavity 335 from electromagnetic noise originating from outside of the antenna cavity 335. As described herein, the noise may originate from any device also operatively coupled to the information handling system, any device near the information handling device, as well as from operation of the antenna 318 itself. Because the chassis of the information handling system is metal, operation of the antenna 318 via emissions of electromagnetic (EM) waves (i.e., RF signals at 2.4 GHz for example) causes those EM waves to resonate with the metal chassis causing such noise. In order to avoid this phenomenon, the antenna cavity 335 includes the grounding wall described herein in order to insulate the antenna cavity 335 and its antenna 318 from that noise.

In an embodiment, the antenna cavity 335, the chassis of the information handling system, and/or the grounding wall may form a cavity resonator within the antenna cavity 335. A cavity resonator is a hollow closed-in conductor such as a metal cavity, in this embodiment, that contains EM waves (i.e., RF EM waves) reflecting back and forth between the cavity's walls. When the antenna 318 emits a RF signal at one of the antenna cavity's 335 resonant frequencies (i.e., a fundamental frequency at 2.4 GHz or any harmonic frequency of 2.4 GHz such as 5.1 GHz), any oppositely moving waves form standing waves within the antenna cavity 335. In this embodiment, however, the resonating frequencies may be allowed to exit the cavity resonator via the first aperture 316. At the edges created by the first aperture 316, the signal transmission may occur thereby sending the EM RF waves out and away from the information handling system. The size and shape of the first aperture 316 of the antenna cavity 335 may be defined by the placement of any walls formed by the D-cover 304 and any grounding wall. In an embodiment, dimensions of the first aperture 316 may be dependent on the frequency range to be emitted by the antenna 318 and which frequencies the wireless interface adapter is to be operated at. In an embodiment, a length of the first aperture 316 may be between 45 and 55 mm. In an embodiment, the length of the first aperture 316 may be 50 mm. During operation, due to the application of the RF radiation from the antenna 318, current is forced along an edge of the first aperture 316 causing radiation to be emitted from the edges of the first aperture 316 at the target frequency (i.e., ~2.4 GHz or harmonics thereof). Any target frequency, however, is emitted from the edges of the first aperture 316 when the dimension of the first aperture 316 is formed correctly. In any embodiment, the length of the first aperture 316 is ½ of the wavelength of the target frequency.

In an embodiment, the antenna 318 may be a monopole antenna. In some embodiments, the monopole antenna 318 may include a metal conducting strip, excited by an RF signal source such as from the wireless adapter described herein. A length of the conductor may be designed to be a quarter of the wavelength to a fundamental operating frequency of the aperture. In an embodiment, the monopole antenna may be suspended within the cavity at a certain distance from the aperture to effectively couple the currents induced by the RF signal produced by the monopole antenna 318. In this embodiment, the currents may be coupled onto the aperture capacitively over the air to excite the fundamental resonant frequency of the aperture. Further the conductor carrying the RF signal from the source could be a transmission line or a shielded RF cable with a characteristic impedance of 50 ohms (for example, same as the source). To ensure effective impedance transfer, the transmission line or shielded RF cable may be attached to one of the grounding walls of the resonant chamber to short any leakage currents present on the surface of the cable in order to prevent the cable from re-radiating inside the chamber. Re-resonance of the cable within the chamber could create a cavity mode local to the cable and wall that could contain some or all of the electromagnetic energy of the signal thereby preventing that energy from being fully re-radiated and impairing the wireless performance of the information handling system.

The EM RF waves emitted by the monopole antenna 318 within the antenna cavity 335 may be conducted via the first aperture 316 and emitted from the information handling system as described herein (i.e., via the second aperture not shown). Because, in this embodiment, the antenna 318 is a monopole antenna, the length of the monopole antenna 318 may be ¼ of the wavelength at which the antenna 318 is to operate. Consequently, the length of the antenna 318 and the size of the first aperture 316 of the antenna cavity 335 may be dependent on the wavelengths used by the information handling system as well as any governmental or industry standards under which the information handling system is to be operated. In an embodiment, the monopole antenna 318 with first aperture 316 may be sized to transmit and receive EM RF frequencies at or around 5.5 GHz. In an embodiment, the monopole antenna 318 with first antenna aperture 316 may be sized to transmit and receive EM RF frequencies at or around any harmonic frequencies at or around 2.4 GHz including, for example, 5.1 GHz. In another aspect, second aperture 320 may also be sized to transmit EM RF frequencies generated by monopole antenna element 318 and aperture 316 as described from antenna cavity 335. Second aperture 320 may allow EM RF frequencies to pass through the C-cover 306 from the antenna cavity 335 in example embodiments. In an embodiment, antenna cavity 335 and apertures 316 and 320 may be used to steer the EM RF signal of the antenna element 318 out of the antenna cavity 335 and out of either aperture of the antenna cavity 335.

In an embodiment, the antenna cavity 335 may include a parasitic element or other type of coupled device used to alter the pattern of the EM RF waves emitted by the antenna 318. The parasitic element may be grounded to a grounding wall. In an embodiment, the parasitic element may be operatively coupled to a variable impedance termination. In some embodiments, the parasitic element may make other frequency bands available. In other embodiments, using a parasitic element with a variable impedance termination and cause a shift of transmission pattern to create higher order resonant modes for increased usability of the antenna system with a wider range of global EM RF bands in the 5 GHz range. Global band coverage may vary by jurisdiction, protocol, or location such that providing for embodiments of the presently-disclosed antenna system with parasitic elements that may be utilized to provide multiple possible resonant modes allowing for operation in a broader global 5 GHz band coverage. The antenna adaptation controller 134 may control this tuning for the antenna ports for the antenna 318 to alter RF transmission frequencies and pattern potentially improve RSSI, SNR, MCS or other performance factors or adjust according to operating 5 GHz frequencies in some embodiments for various locales. In this embodiment, the parasitic coupling element 350 may create a plurality of higher order resonant modes to increase the global band coverage of the 5 GHz-operated antenna element. In an example embodiment, three resonant modes of the 5 GHz antenna element may be realized through the use of the parasitic coupling element 350. First, the monopole antenna element 318 may be excited to operate at 5 GHz. Second, even harmonics of a 2.4 GHz-sized aperture that falls into 5 GHz may be implemented. Third, the parasitic coupling element 350 may resonate at a higher end of a 5 GHz frequency. These three modes are designed to operate such that the frequencies bond constructively to create the wide band 5G coverage while limiting frequency overlapping and providing for increased global band coverage at 5 GHz.

Figure 3E:
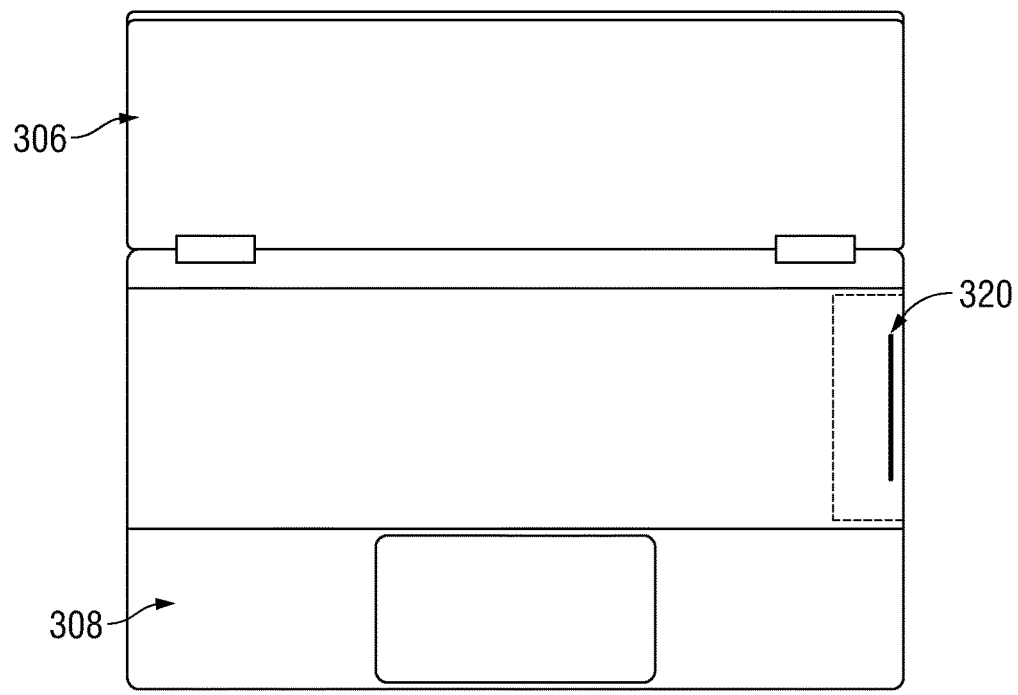
FIG. 3E is a graphical illustration top view of a second aperture containing an antenna within an antenna cavity, the second aperture formed in the C-cover according to an embodiment of the present disclosure.
Figure 3F:
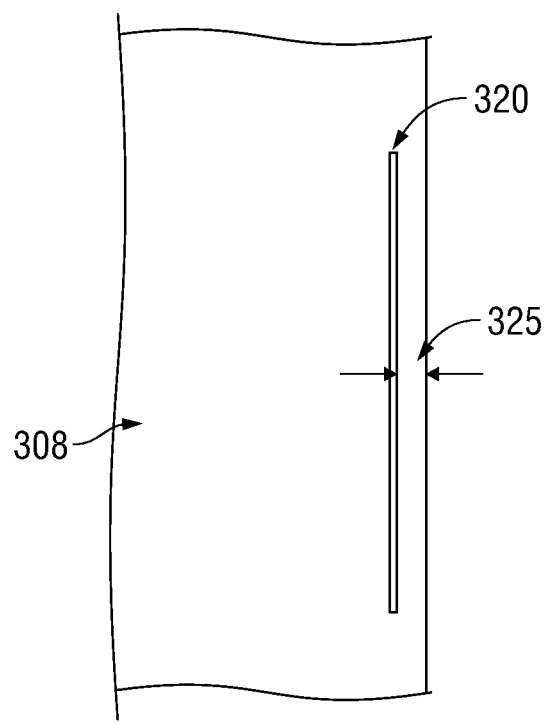
FIG. 3F is another graphical illustration top view of the second aperture containing the antenna within an antenna cavity, the second aperture formed in the C-cover according to an embodiment of the present disclosure.

FIG. 3E is another graphical illustration of a second aperture 320 containing the antenna 318 within the antenna cavity 335, the second aperture 320 formed in the C-cover 308 according to an embodiment of the present disclosure. Even further, FIG. 3F is a close up view of a graphical illustration of a second aperture 320 containing the antenna 318 within an antenna cavity, the second aperture 320 formed in the C-cover 308 according to an embodiment of the present disclosure. As described herein, the antenna cavity 335 formed within the C-cover 308 and D-cover 304 assembly may be operatively coupled to a first aperture 316 shown in FIG. 3D as well as the second aperture 320 shown here in FIG. 3E. Similar to the first aperture 316, the second aperture 320 may be sized to operate a certain frequency or pass certain frequencies transmitted in the first aperture 316 and antenna cavity.

In an embodiment, the second aperture 320 may be sized to operate at a frequency of 2.4 GHz or any harmonic thereof. In an embodiment, the width of the second aperture 320 along the side of the information handling system may be 1.5 mm wide in an embodiment. It is understood that any width may be used depending on the frequency bands to be passed or the aesthetic requirements of the second aperture in the C-cover 308. In example embodiments, the second aperture width may be between 1 and 3 mm wide in example embodiments although wider apertures are contemplated as well. Narrower apertures may also operate when differing bandwidths and frequencies are involved or different geometry of the antenna cavity 335 are deployed in various embodiments as well. In this embodiment the second aperture 320 acts as a resonant aperture allowing an RF signal emitted from the antenna 318 to escape from the antenna cavity 335. An angular relationship of the second aperture 320 to the antenna 318 may be such so as to avoid the RF signal being blocked from exiting the antenna cavity 335. Upward transmission from the first antenna aperture 316 into the antenna cavity may be angled to pass through the second antenna aperture 320 in an embodiment. In this way, transmission and reception characteristics may be upward from the C-cover to allow better above-horizon radio frequency directionality in some configurations of the information handling system.

In an embodiment, the second aperture 320 may be formed along an edge of the C-cover 308. In an embodiment, the second aperture 320 may be formed along the edge of the C-cover 308 at a distance 325 away from the side of the information handling system. In this embodiment the distance 325 may be 4 mm. In an embodiment, the distance 325 may be between 3 and 5 mm. Other distances of 325 may be contemplated as well in other embodiments depending on the angle of the first aperture 316, location of the antenna element 318, or location of the antenna cavity 335. The placement of the second aperture 320 relative to the first aperture 316 and/or antenna 318 may be set based on the resonating properties of the antenna cavity 335, the angle of the first aperture 316 with the cavity 335, and the placement of the antenna 318 within the antenna cavity 335.

In an embodiment, the second aperture 320 may be formed at a location above the first aperture 316. According to the embodiment presented in FIG. 3E the second aperture 320 is shown within block "A" with the second aperture 320 is in the form of a narrow (for example, 1.5 mm) gap running parallel to an edge of the C-cover 308 and close to a mechanical interface between the C-cover 308 and D-cover 304. The distance from the edge 325 may depend on the above.

Because the second aperture 320 is formed through the C-cover 308, the second aperture 320 may be exposed to interaction by the user due to the fact that the second aperture 320 is located around an area the user interacts with input devices such as the keyboard, keypad, power button, or other such devices. Unlike the first aperture 316, the second aperture 320 forms a channel down into the antenna cavity 335 that houses the antenna 318. The antenna 318 within the antenna cavity 335, along with other devices within the antenna cavity 335, may be damaged should dust or other particles fall within the sot defining the second aperture 320. In order to avoid such damage, the second aperture 320 may be filled with a non-conductive material and/or radio frequency transparent material. This non-conductive material will not affect the EM pattern produced by the currents flowing from the antenna 318 and through the second aperture 320. In an embodiment, the non-conductive material may be a glass or plastic. In an embodiment the non-conductive material may be a combination (either in heterogenous layering of the materials or homogenous mixtures of the materials) of different materials. In an embodiment, the non-conductive material may be a glass fill with a glass filled or ceramic filled plastic (e.g. glass fill CMF). In any embodiment described herein, the non-conductive material used to fill the second aperture 320 may be chosen based on tactile feel of the material as well as aesthetics associated with that material. In these embodiments, the non-conductive material may be chosen so as to prevent the user from discovering the location of the second aperture 320 thereby preventing a user from tampering with the fill and the second aperture 320.

During operation of the antenna 318, the antenna 318 may emit a radio frequency signal via application of a current at a voltage set by the wireless interface adapter and or antenna adaption controller described herein in connection with FIG. 1. The antenna 318 may operate at 5.8 GHz with a main lobe of the generated RF signal being directed towards the bottom of the D-cover 304. In order to tilt the direction of the generate RF signal from the bottom of the D-cover 304 to the horizon, the second aperture 320 is used. The second aperture 320 and the first aperture 316 are grounded to a common ground such as a grounding wall within the antenna cavity 335. This produces a low impedance path form the first aperture 316 to the second aperture 320 enabling the currents produced by the antenna 318 to migrate away from the first aperture 316 to the second aperture 320 causing the RF signal to exit from the cavity 335 via the second aperture 320. This produces a new RF signal pattern emitted by the antenna 318 to be created; a pattern that includes a main lobe directed towards the horizon up and away from the information handling system.

Figure 3G:
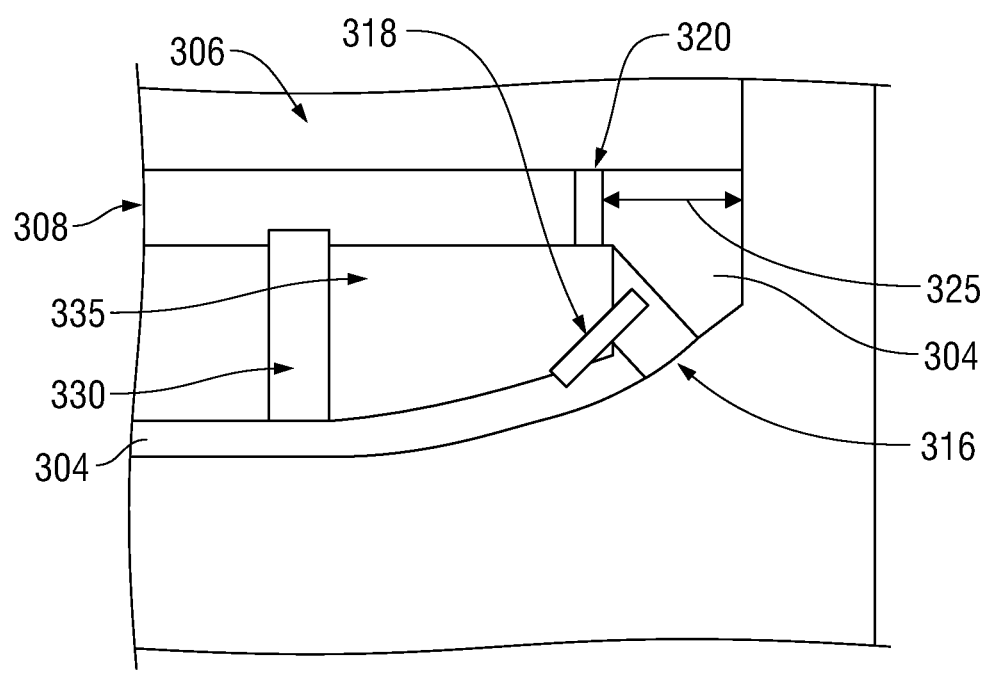
FIG. 3G is a cut-away graphical illustration of a first and second aperture formed in a D-cover and C-cover, respectively, according to an embodiment of the present disclosure.

FIG. 3G is a cut-out graphical illustration of a first and second aperture 320 formed in a D-cover 304 and C-cover 308, respectively, according to an embodiment of the present disclosure. FIG. 3G shows the D-cover 304 and C-cover 308 forming the antenna cavity 335 due to the metal walls of the D-cover 304 and C-cover 308 as well as through the use of a grounding wall 330. The grounding wall 330 may act as a part of the antenna cavity 335 that reflects the radio waves from the antenna 318 so as to develop certain characteristics of the antenna 318 in the signal emitted by the antenna 318. In the present disclosure, the grounding wall 330 may ground both the first aperture 316 and second aperture 320 forming a resonant cavity 335 and a low impedance path to the second aperture 320. As shown in FIG. 3G, the D-cover 304, C-cover 308, and grounding wall 330 may create the resonant cavity that allows standing waves of a target frequency to resonate within the antenna cavity 335 in order to store the RF EM energy therein.

In an embodiment, the antenna 318 may be a monopole antenna that has a length of a quarter of the target frequency (i.e., a quarter length of 5.8 GHz or its harmonics). As shown in FIG. 3G, the antenna 318 is placed close to the first aperture 316 and second aperture 320: i.e., further away from the grounding wall 330 than from the first aperture 316 and second aperture 320. By placing the antenna 318 closer to the first aperture 316, currents induced by the antenna 318 are transferred through strong capacitive coupling, resulting in an improved gain of the fundamental resonant frequency of the first aperture. Additionally, by placing the antenna 318 closer to the first aperture 316 improves antenna impedance match via the added capacitance contributed by the gap or spacing between the antenna 318 closer to the first aperture 316. Accordingly, the second aperture 320 may be placed in the C-cover above the first aperture 316 so as to be placed in front of the internal aperture transmission zone of the first aperture 316 thereby preventing any destructive interference created by any waves redirected to the second aperture 320 from being out of phase.

Because the antenna 318 is placed within an antenna cavity 335 formed within the C-cover 308 and D-cover 304 assembly, the information handling system may include a relatively larger video display at the A-cover and B-cover assembly with a narrower bezel than could be realized if the antenna 318 was placed within the A-cover and B-cover assembly. Because the antenna 318 is placed within the metal C-cover 308 and D-cover 304, a dual aperture system may be formed so as to redirect a RF EM pattern towards the second aperture 320 as described herein. The ground path created by a grounding wall 330 within the antenna cavity 335 causes a reduced impedance between the first aperture 316 and second aperture 320 causing the RF EM pattern to be tilted towards the horizon and away from the top of the C-cover 308. This allows for relatively better wireless performance especially with communications with access points above the horizon. Additionally, the redirection of the RF EM pattern towards to the horizon prevents a user's body (i.e., a user's lap) from absorbing those EM waves emitted by the antenna 318 thereby complying, in some embodiments, with government mandated specific absorption rates (SAR). Additionally, the grounding wall 330 placed electrically between the first aperture 316 and second aperture 320 allows for the tuning of the second aperture 320 to operate in tandem with the first aperture 316.

In an embodiment, the antenna 318 may be a or a series of printed traces mounted in the cavity 335. The location of the antenna 318 may be selected in order to resonant the created EM waves within the cavity 335. In this embodiment, the EM waves may reflect back and forth between the walls of the cavity. The internal size of the cavity 335 may allow for a fundamental frequency such as 2.4 GHz and its harmonics to resonate therein. By placing the antenna 318 closer to the first aperture 316, currents induced by the antenna 318 are transferred through strong capacitive coupling, resulting in an improved gain of the fundamental resonant frequency at the first aperture. Additionally, placing the antenna 318 closer to the first aperture 316 improves antenna impedance match via the added capacitance contributed by the gap or spacing between the antenna 318 closer to the first aperture 316. Accordingly, the second aperture 320 may be placed in the C-cover above the first aperture 316 so as to be placed in front of the internal aperture transmission zone of the first aperture 316 thereby preventing any destructive interference created by any waves redirected to and through the second aperture 320 from being out of phase.

Figure 4:
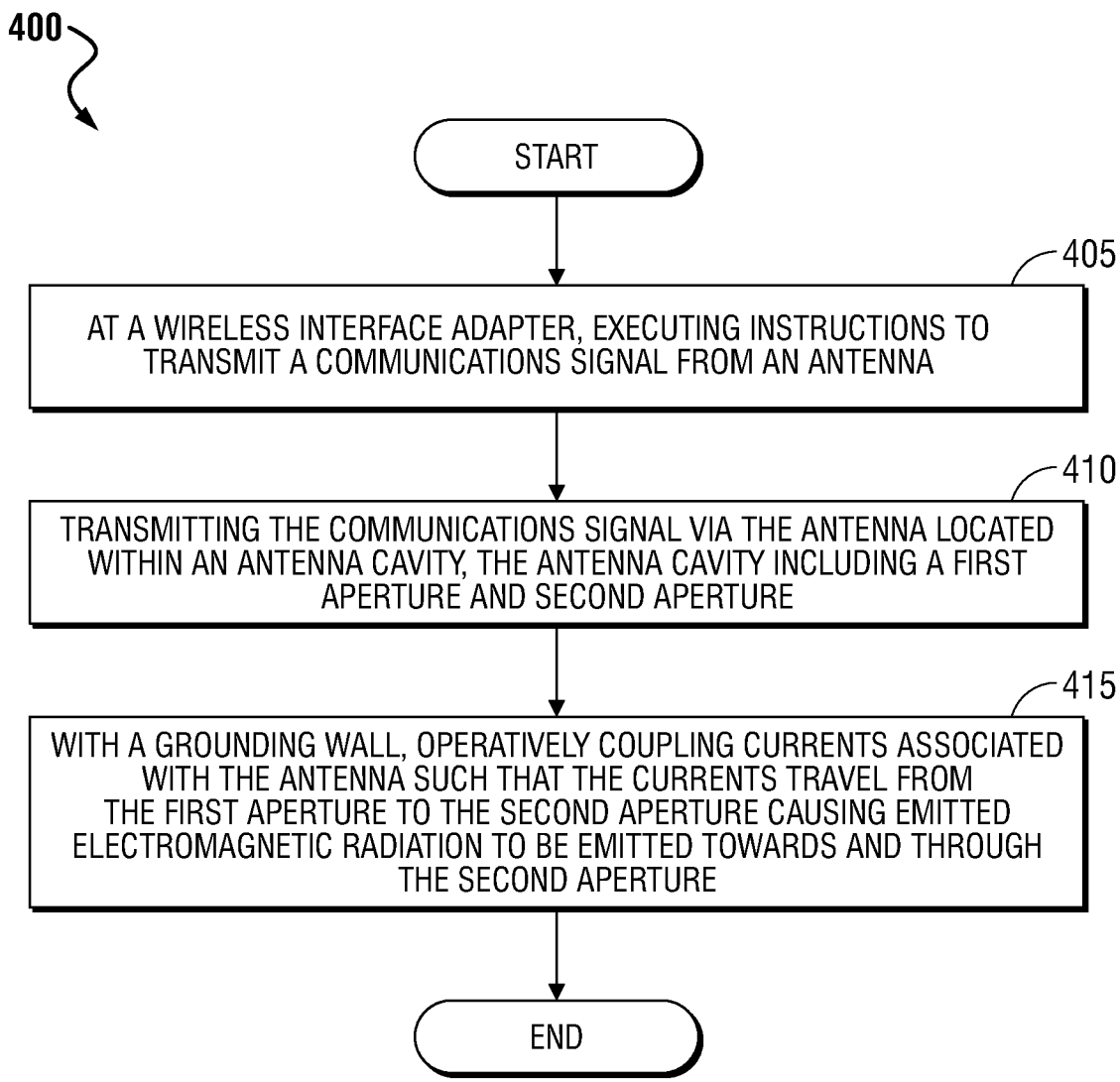
FIG. 4 is a flow diagram illustrating a method for operating an information handling system having an antenna within an antenna vent having a first aperture and a second aperture.

In any embodiment described herein, the antenna cavity 335 may include any additional antenna elements that allow for further functionality of the antenna 318 described herein. In a specific embodiment, the antenna cavity 335 may also house a parasitic element to provide for utilization of the antenna 318, antenna cavity 335, and first and second apertures 316 and 320 with other frequency bands. The parasitic element may be grounded to the grounding wall 330 or some other grounding source. In an embodiment, the parasitic element may be used to steer the EM RF signal out of the second aperture 320 or towards the second aperture 320 of the antenna cavity 335. In an embodiment, the parasitic element may modify the EM RF pattern emitted by the antenna 318 so as to direct the EM RF pattern in a specific direction such as towards the second aperture 320 for some frequency bands. The parasitic element may be one of a reflector-type parasitic element or a director-type parasitic element: either reflecting the EM RF waves it a direction opposite the parasitic element or directing the EM RF waves in a specific direction (thereby increasing the EM RF emissions in that specific direction), respectively. In this embodiment, the parasitic coupling element 350 may create higher order resonant modes to increase the global band coverage of a 5 GHz-operated antenna element. In this embodiment, three resonant modes of the 5 GHz antenna element may be realized through the use of the parasitic coupling element 350. Resonant modes may include the monopole antenna element excited to operate at 5 GHz, operation of even harmonics of a 2.4 GHz-sized aperture that falls into 5 GHz, and with having the parasitic coupling element 350 resonating at a higher end of a 5 GHz frequency. These three modes are designed to operate such that the frequencies bond constructively to create the wide band 5G coverage while limiting frequency overlapping FIG. 4 is a flow diagram illustrating a method 400 for operating an information handling system having an antenna within an antenna vent having a first aperture and a second aperture. The method 400 may include, at block 405, executing instructions to transmit a communications signal from an antenna at a wireless interface adapter. In an embodiment, these instructions may be executed by the processor of the information handling system. In an embodiment, these instructions may be executed specifically by an antenna adaption controller associated with the wireless interface adapter. In an embodiment, the execution of these instructions may be completed partially by the processor of the information handling system and antenna adaption controller. In any of these embodiments, the execution of the instructions causes a voltage at a certain current or currents to be applied to an antenna such as a monopole antenna placed within an antenna cavity. As described herein, the signals sent to the antenna may cause the emission of electromagnetic waves in any range of a radio frequency on the EM spectrum from the antenna or at a specific target radio frequency on the EM spectrum. The specific target ranges of RF EM waves emitted from the second aperture as a consequence of this excitation of the antenna may depend on the size of the second aperture as described herein. In an embodiment, the target RF EM waves to be emitted from the antenna is 5.8 GHz. In an embodiment, the target RF EM waves to be emitted from the antenna is 5 GHz. In an embodiment, the target RF EM waves to be emitted from the antenna is 2.4 GHz.

At block 410, the communications signal may be transmitted by the antenna. This communications signal may comprise any signal that transmits data from the information handling system used to communicate with other devices communicatively coupled to the information handling system. As described herein, the antenna used to transmit the data may be placed within an antenna cavity formed within a metal C-cover and D-cover assembly. The specific arrangement of the antenna cavity relative to the C-cover and D-cover as shown in FIGS. 3D through 3G includes a first aperture and a second aperture originating at an antenna cavity formed within the D-cover and C-cover assembly, respectively. The placement of the first aperture may be through a surface of the D-cover and may, in an embodiment, point down through a bottom edge, or a bottom, rounded edge of the D-cover. The placement of the second aperture, in an embodiment, may be through a surface of the C-cover. According to a number of embodiments of the present specification, the placement of the second aperture relative to the first aperture may be such that the second aperture may be tuned to operate in tandem with the first aperture by varying angle and location between them and relative to the grounding wall forming an antenna cavity such as 335. Additionally, the placement of the second aperture relative to the first aperture may be such that the second aperture is placed in the C-cover above the internal aperture transmission zone of the first aperture in order to prevent any destructive interference created by any waves redirected to the second aperture from being out of phase.

In an embodiment, the antenna may be placed within the antenna cavity at a location closer to the first aperture and second aperture than to a grounding wall. In this embodiment, the angular relationship of the second aperture to the antenna may be such so as to avoid the RF signal being blocked from exiting the antenna cavity as described herein.

The method 400 may continue at block 415 to, with a grounding wall, operatively couple currents associated with the antenna such that the currents travel from the first aperture to the send aperture causing emitted electromagnetic radiation to be emitted towards the second aperture. In any embodiment, the antenna cavity may include a grounding wall to which the first aperture and second aperture are electrically coupled. In an embodiment, during use of the antenna, the second aperture and the first aperture are grounded to the grounding wall. This produces a low impedance path from the first aperture to the second aperture enabling the currents produced by the antenna to migrate away from the first aperture to the second aperture causing the RF signal to exit from the second aperture. This produces a new RF signal pattern emitted by the antenna to be created than would not otherwise be realized with the use of the first aperture alone. In an embodiment, this pattern includes a main lobe of the RF EM signal being directed towards the horizon up and away from the information handling system.

The blocks of flow diagram of FIG. 4 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system to wirelessly transmit and receive data at an antenna comprising:
   a processor, a memory and a wireless interface circuit;
   a base housing metal chassis containing components of the information handling system, the base housing metal chassis including a C-cover and D-cover housing the components;
   the antenna located within an antenna cavity and operatively coupled to the wireless interface circuit to transmit and receive wireless signals via electromagnetic (EM) frequency radiation;
   the antenna cavity formed within the C-Cover and D-cover along a side of the base housing metal chassis including:
      a first aperture formed through a portion of the D-cover;
      a second aperture formed through a portion of the C-cover over the first aperture such that transmission from the first aperture reaches the second aperture through the antenna cavity; and
      a grounding wall formed within the antenna cavity to operatively couple currents associated with the antenna such that the currents travel from the first aperture to the second aperture causing emitted electromagnetic radiation to be emitted towards the second aperture.

2. The information handling system of claim 1, wherein the second aperture is a slot formed along an edge of the C-cover and is between 1 mm and 3 mm wide.

3. The information handling system of claim 1, wherein the second aperture is concealed by filling the aperture cavity with a glass substrate.

4. The information handling system of claim 1, wherein the first aperture is sized to operate at a frequency of 2.4 GHz.

5. The information handling system of claim 1, wherein the second aperture directs the EM frequency radiation through the C-cover and above horizon in an open configuration of the information handling system.

6. The information handling system of claim 1, wherein the first aperture is formed through and directed at an angle from a bottom surface of the D-cover toward the second aperture formed in the C-cover.

7. The information handling system of claim 1, wherein the second aperture is grounded to the D-chassis forming a low impedance path between the first aperture and second aperture causing the emitted electromagnetic radiation to be emitted towards the second aperture.

8. The information handling system of claim 1, wherein the second aperture formed through the C-cover is in the form of a slot running parallel to a side surface of the information handling system and wherein the slot is formed between 3 and 5 mm away from the side surface of the information handling system.

9. A cavity backed antenna system for an information handling system comprising:
   a C-cover made of metal to house a keyboard;
   a D-cover made of metal as a base chassis including:
      an antenna cavity;
      an antenna element to transmit an electromagnetic (EM) signal via a wireless interface; and
      a first aperture formed through a portion of the D-cover and operatively coupled to the antenna element to radiate the EM signal; and
   a second aperture formed through a portion of the C-cover and operatively coupling the antenna cavity through the C-cover; and
   a grounding wall formed within the antenna cavity to create a low impedance path from the first aperture to the second aperture.

10. The assembly of claim 9, wherein the second aperture is concealed by filling the aperture cavity with a radio frequency transparent material.

11. The assembly of claim 9, wherein the first aperture is sized to operate at a frequency of 2.4 GHz.

12. The assembly of claim 9, wherein the second aperture directs the EM frequency radiation through the C-cover and above horizon in an open configuration of the information handling system.

13. The assembly of claim 9, wherein the first aperture is formed through and directed at an angle to transmit from a bottom surface of the D-cover into the antenna cavity and away from the D-cover when coupled to the antenna element.

14. The assembly of claim 9, wherein the grounding wall is electrically coupled to the D-cover and wherein the second aperture is grounded to the D-chassis via the grounding wall thereby forming a low impedance path between the first aperture and second aperture and causing the emitted electromagnetic radiation to be emitted through the second aperture in the C-cover.

15. The assembly of claim 9, wherein the second aperture formed through the C-cover is in the form of a slot running parallel to a side surface of the information handling system and wherein the slot is formed between 3-5 mm away from the side surface of the information handling system.

16. An information handling system to transmit a communication signal comprising:
   a processor and a memory;
   a wireless interface adapter including an antenna adaption controller to selectively apply a current at a voltage to an antenna within an antenna cavity;
   a base housing metal chassis containing components of the information handling system, the base housing metal chassis including a C-cover and D-cover housing the components; and
   the antenna cavity formed within a base assembly between the C-Cover and D-cover including:
      a first aperture formed through a portion of the D-cover;
      a second aperture formed through a portion of the C-cover and along an edge of the C-cover, and wherein the antenna is located along the first aperture and along an edge of the antenna cavity to provide a larger resonant cavity volume in the antenna cavity; and a grounding wall formed within the antenna cavity to operatively couple currents associated with the antenna such that the currents travel from the first aperture to the second aperture causing emitted electromagnetic radiation to be emitted through the second aperture in the C-cover.

17. The information handling system of claim 16, wherein the second aperture is concealed by filling the aperture cavity with a radio frequency transparent material.

18. The information handling system of claim 16, wherein second aperture directs the electromagnetic radiation out of the C-cover and above horizon as the information handling system is placed in a predetermined configuration.

19. The information handling system of claim 16, wherein the first aperture is formed through and directs electromagnetic radiation at an angle away from a side of the D-cover.

20. The information handling system of claim 16, wherein the second aperture formed through the C-cover is in the form of a slot running parallel to a side surface of the information handling system and wherein the slot is formed 4 mm away from the side surface of the information handling system.

* * * * *